United States Patent [19]
Nakayama et al.

[11] Patent Number: 5,666,332
[45] Date of Patent: Sep. 9, 1997

[54] MAGNETO-OPTICAL RECORDING MEDIUM PERMITTING AN INITIALIZING MAGNETIC FIELD SMALLER THAN A RECORDING MAGNETIC FIELD, AND METHOD OF RECORDING THERE ON

[75] Inventors: Junichiro Nakayama; Michinobu Mieda, both of Shiki-gun; Junji Hirokane; Akira Takahashi, both of Nara, all of Japan

[73] Assignee: Sharp Kabushiki Kaisha, Osaka, Japan

[21] Appl. No.: 652,810

[22] Filed: May 23, 1996

[30] Foreign Application Priority Data

Jun. 9, 1995 [JP] Japan ................................ 7-143763

[51] Int. Cl.⁶ .................................................. G11B 11/00
[52] U.S. Cl. ........................ 369/13; 360/59; 428/694 ML
[58] Field of Search ........................... 369/13, 14, 275.2, 369/275.3, 110, 112, 283, 284, 288; 360/114, 59; 428/694 MM, 694 ML

[56] References Cited

U.S. PATENT DOCUMENTS

| 5,241,520 | 8/1993 | Ohta et al. ................................ 369/13 |
| 5,278,810 | 1/1994 | Takahashi .................................. 369/13 |
| 5,428,585 | 6/1995 | Hirokane et al. ......................... 369/13 |
| 5,457,582 | 10/1995 | Victora et al. ............................. 360/59 |
| 5,486,395 | 1/1996 | Murakami et al. .................... 369/13 X |
| 5,493,545 | 2/1996 | Matusmoto .............................. 369/13 |
| 5,502,692 | 3/1996 | Osato ....................................... 369/13 |

FOREIGN PATENT DOCUMENTS

| 0 608134 A2 | 7/1994 | European Pat. Off. . |
| 0 619 577 A1 | 10/1994 | European Pat. Off. . |
| 5-30315 | 2/1993 | Japan . |
| 5 22303 | 3/1993 | Japan . |
| 5-47833 | 7/1993 | Japan . |
| 7-129022 | 5/1995 | Japan . |

*Primary Examiner*—Ali Neyzari
*Attorney, Agent, or Firm*—David G. Conlin; Brian L. Michaelis

[57] ABSTRACT

A magneto-optical recording medium with a first, second, and third magnetic layers which are laminated on a substrate. The first magnetic layer has a perpendicular magnetization in a temperature range between room temperature and its Curie temperature. The second magnetic layer has an in-plane magnetization at room temperature, and has a perpendicular magnetization at or above a temperature falling within a range between room temperature and its Curie temperature. The third magnetic layer has an in-plane magnetization at room temperature, and has a perpendicular magnetization at or above a temperature falling within a range between room temperature and the temperature at which a transition occurs in the second magnetic layer from the in-plane magnetization to the perpendicular magnetization. Accordingly, since the second and third magnetic layers have the in-plane magnetization at room temperature, it is possible to previously direct the magnetization of the third magnetic layer in a single specific direction by the induction of an initializing magnetic field during a rise in temperature caused by a laser beam projection. Therefore, the initializing magnetic field can be set smaller than a recording magnetic field. As a result, it is possible to reduce the size of a recording device.

19 Claims, 5 Drawing Sheets

FIG. 1

MOVING DIRECTION OF RECORDING MEDIUM

MOVING DIRECTION OF RECORDING MEDIUM

MAGNETO-OPTICAL RECORDING MEDIUM PERMITTING AN INITIALIZING MAGNETIC FIELD SMALLER THAN A RECORDING MAGNETIC FIELD, AND METHOD OF RECORDING THERE ON

FIELD OF THE INVENTION

The present invention relates to a magneto-optical recording medium, such as an optical disk and an optical card on which information is recorded in accordance with the directions of the magnetization, as well as relates to a method of recording information on such a magneto-optical recording medium.

BACKGROUND OF THE INVENTION

A conventional magneto-optical recording medium is composed of a substrate in a disk form, and a magnetic layer with perpendicular magnetization provided on the substrate. The magnetic layer is made of, for example, rare earth-transition metal alloys. The recording and reproducing operations with respect to the magnetic layer of the magneto-optical recording medium is performed in the manner presented below.

Prior to the recording operation, first, in order to initialize the recording medium, the magnetizations are directed to a single specific direction (upward or downward) in accordance with a externally applied strong magnetic field, namely, an initializing magnetic field. Next, a laser beam is projected onto a recording area of the recording medium so as to raise temperature thereof above the vicinity of its Curie temperature or above the vicinity of its compensation temperature. As a result, coercive force (Hc) in the projected area becomes zero or nearly zero. In this state, an externally applied magnetic field having a direction opposite to that of the initializing magnetic field is applied, thereby reversing the magnetization direction. After the projection of the laser beam is stopped, the temperature of the recording medium drops to room temperature, and the reversed magnetization direction is fixed, thereby recording information thermomagnetically in accordance with respective directions of magnetization. When the reproducing operation is to be carried out, a linearly polarized laser beam is projected onto the recording medium, and the recorded information is optically read out utilizing an effect, such as magnetic Kerr effect or magnetic Faraday effect, that the polarization plane of reflected or transmitted light rotates according to the magnetization direction.

The magneto-optical recording medium has been viewed with interest as a rewritable high density and large capacity memory device. As a method for rewriting information on the magneto-optical recording medium, a method of overwriting by the light intensity modulation has been proposed. This light modulation overwriting method is for use with a magneto-optical recording medium which has a recording layer composed of two reciprocally exchange-coupled magnetic films. According to the method, an initializing magnetic field (Hi) and a recording magnetic field (Hw) are adopted respectively when initializing and recording, and information is rewritten by modulating the light intensity of the laser beam projected on the recording medium.

Another magneto-optical recording medium has been proposed by Japanese Examined Patent Publication No. 5-22303/1993, for use with the foregoing method of overwriting. The proposed magneto-optical recording medium has a triple-layered recording layer on a substrate 21 (see FIG. 7), so that the initializing magnetic field (Hi) is reduced and the stability of recording bits is enhanced.

Figure 7:
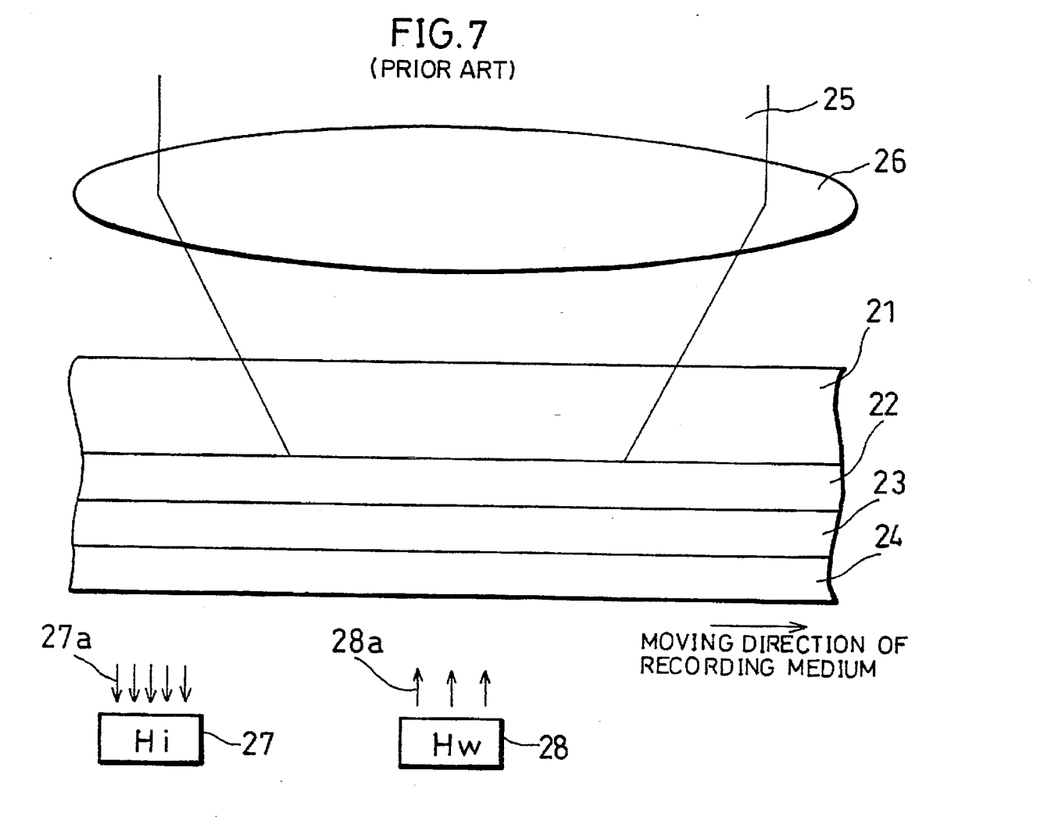
FIG. 7 is an explanatory view showing an arrangement of a conventional magneto-optical recording medium.

Thus, the magneto-optical recording medium has a first magnetic layer 22, a second magnetic layer 23, and a third magnetic layer 24. The first magnetic layer 22 is a magnetic thin film with a perpendicular magnetization, which has a low Curie temperature and great coercive force. The third magnetic layer 24 is a magnetic thin film with a perpendicular magnetization, which has a relatively high Curie temperature and relatively small coercive force in comparison with the first magnetic layer 22. The second magnetic layer 23, provided between the first and third magnetic layers 22 and 24, has an in-plane magnetization at room temperature while a perpendicular magnetization as temperature rises.

The initializing magnetic field (Hi) 27a is set smaller than the coercive force of the first magnetic layer 22 at room temperature, while greater than the coercive force of the third magnetic layer 24 at room temperature. Therefore, the direction of the magnetization of the first magnetic layer 22 is not reversed by the initializing magnetic field (Hi) 27a at room temperature.

Since the second magnetic layer 23 is arranged so as to have an in-plane magnetization at room temperature, such an arrangement prevents, at room temperature, the magnetic coupling of the first magnetic layer 22 and the third magnetic layer 24 based on the exchange-coupling force.

The following description will explain the procedure of an overwriting operation with respect to such a magneto-optical recording medium. First, for the initialization, the initializing magnetic field (Hi) 27a is applied to the magneto-optical recording medium, thereby directing the magnetization in only the third magnetic layer 24 in one direction, for example, downward as shown in FIG. 7.

Then, a recording operation is performed by projecting a laser beam 25 on the magnetic layers 22–24 while applying on the layers a recording magnetic field (Hw) 28 whose direction of the magnetic field is directed in the direction opposite to that of the initializing magnetic field (Hi) 27a, that is, upward in this case. The laser beam 25, converged by an objective lens 26 onto the first magnetic layer 22, is modulated so as to have light intensity of its power between high power and low power, thereby varying the direction of the magnetization of the first magnetic layer 22 in accordance with the modulated light intensity. Information is recorded in accordance with the direction of the magnetization, which is thus varied.

The power of the laser beam 25 is arranged so that the high power laser beam 25 raises the temperature of the recording medium to T3, which is in the vicinity of the Curie temperature of the third magnetic layer 24, whereas the low power laser beam 25 raises the temperature of the recording medium to T2, which is in the vicinity of the Curie temperature of the first magnetic layer 22.

Therefore, when the high power laser beam 25 is projected while the recording magnetic field (Hw) 28a is applied to the third magnetic layer 24, the direction of the magnetization of the third magnetic layer 24 is reversed upward. Then, in the process of cooling off, by the exchange-coupling force exerted on an interface of the magnetic layers, the magnetization direction of the third magnetic layer 24 is copied to the second magnetic layer 23, which now has a perpendicular magnetization due to a rise in temperature, and then to the first magnetic layer 22. Thus, the direction of the magnetization of the first magnetic layer 22 is directed upward.

On the other hand, when the low power laser beam 25 is projected while the recording magnetic field (Hw) 28a is applied to the third magnetic layer 24, the direction of the magnetization of the third magnetic layer 24 remains unchanged, because the coercive force of the third magnetic layer 24 is greater than the recording magnetic field (Hw) 28a. As mentioned above, the direction of the magnetization of the third magnetic layer 24 is copied to the first magnetic layer 22 through the intermediary of the second magnetic layer 23, by the exchange-coupling force exerted on the interface of the magnetic layers in the process of cooling off. Accordingly, the direction of the magnetization of the first magnetic layer 22 is directed downward.

Note that the power of the laser beam in reproducing is set considerably smaller than the low power of the laser beam in recording. Therefore, the second magnetic layer 23 is arranged so that its in-plane magnetization is unaffected by such a laser beam of reproducing-use power. In other words, the second magnetic layer 23 prevents the direction of the magnetization of the third magnetic layer 24 from being copied to the first magnetic layer 22 by means of the exchange-coupling force.

As has been mentioned so far, with such an arrangement, the initializing magnetic field (Hi) 27a is set greater than the coercive force of the third magnetic layer 24 at room temperature, while the recording magnetic field (Hw) 28a is set in the vicinity of the midpoint between the respective coercive forces which the third magnetic layer 24 has at the respective temperatures when the high power laser beam 25 is projected and when the low power laser beam 25 is projected. Therefore, the initializing magnetic field (Hi) 27a is set considerably greater than the recording magnetic field (Hw) 28a. In addition, the initializing magnetic field (Hi) 27a is set to have a magnetization direction opposite to that of the recording magnetic field (Hw) 28a.

The above-mentioned conventional arrangement, however, has presented a problem that a recording device for recording information on a magneto-optical recording medium tends to be bulky, especially when the magnetic field generating units 27 and 28, for respectively generating the initializing field (Hi) 27a and the recording magnetic field (Hw) 28a are separately provided.

On the other hand, when the magnetic field generation units 27 and 28 are integrally provided, the conventional arrangement presents another problem that the control is required for reversing the direction of the magnetization of the recording magnetic field (Hw) 28a with respect to the initializing magnetic field (Hi) 27a. In addition, since the initializing magnetic field (Hi) 27a is greater than the recording magnetic field (Hw) 28a, the conventional arrangement in this case also presents the problem that such a unit for generating the magnetic fields tends to be bulky.

SUMMARY OF THE INVENTION

The object of the present invention is to provide to a magneto-optical recording medium which allows an initializing magnetic field to be set smaller than a recording magnetic field, thereby reducing the size of a recording device for use with the magneto-optical recording medium, and also to provide a method for carrying out recording with respect to the magneto-optical recording medium.

To achieve the above object, a magneto-optical recording medium is composed of a substrate, and a first, second, and third magnetic layers which are laminated on the substrate and respectively made of rare earth-transition metal alloys. The first, second, and third magnetic layers have the following properties. (1) The first magnetic layer has a perpendicular magnetization at a temperature in a range between room temperature and its Curie temperature. The first magnetic layer is provided so that information is read out in accordance with a direction of the perpendicular magnetization of the first magnetic layer, to which a laser beam is projected. (2) The second magnetic layer has an in-plane magnetization at room temperature, and has a perpendicular temperature at or above a certain temperature which falls within a temperature range between room temperature and its Curie temperature. The second magnetic layer is provided so as to control exchange-coupling force exerted between the third and first magnetic layers in accordance with temperature change due to a projected laser beam. (3) The third magnetic layer has an in-plane magnetization at room temperature while it has a perpendicular magnetization at or above a temperature falling within a range between room temperature and a temperature at which a transition occurs in the second magnetic layer from the in-plane magnetization to the perpendicular magnetization. The magnetization direction is recorded as information on the third magnetic layer in accordance with temperature change due to the projected laser beam as well as in accordance with an external magnetic field, and the magnetization direction thus recorded is copied to the first magnetic layer through the intermediary of the second magnetic later.

With such an arrangement, (1) by modulating the light intensity of the laser beam so as to raise temperature to different levels and (2) by use of the external magnetic field, two directions of the magnetization which are antiparallel to each other are selectively given to the third magnetic layer, in accordance with information to be recorded. The respective directions of the magnetization are copied to the first magnetic layer through the second magnetic layer by the exchange-coupling force exerting on the interface between the magnetic layers. Thus, information can be recorded on the first magnetic layer by the light intensity modulation.

To be more specific, the laser beam is projected on the first, second and third magnetic layers so as to heat to above a temperature such that the second magnetic layer has a perpendicular magnetization, while the external magnetic field as an initializing magnetic field is applied to the layers. First of all, a transition occurs in the third magnetic layer from the in-plane magnetization to the perpendicular magnetization. Induced by the initializing magnetic field, the magnetization of the third magnetic layer is directed to one direction in accordance with the initializing magnetic field. Thus, an initialization is carried out.

The third magnetic layer loses its coercive force as the temperature rises to its Curie temperature. But, the direction of the magnetization of the third magnetic layer remains unchanged in spite of the recording magnetic field, as long as the temperature raised by the laser beam is not high enough to cause the coercive force of the third magnetic field to be smaller than the strength of the external magnetic field as a recording magnetic field.

On the other hand, when the temperature is further raised such that the coercive force of the third magnetic layer becomes smaller than the strength of the external magnetic field as the recording magnetic field, the direction of the magnetization of the third magnetic layer is reversed by the recording magnetic field.

Then, in the process of the temperature rise caused by the laser beam, the respective magnetization directions of the third magnetic layer are copied to the first magnetic layer having a perpendicular magnetization through the second magnetic layer which has already had a perpendicular magnetization. Thus, recording information on the first magnetic layer in accordance with the magnetization directions is carried out by the light modulation of the laser beam.

In addition, with such an arrangement, the initializing operation for directing the magnetization of the third magnetic layer in one direction in accordance with the initializing magnetic field is carried out by the induction of the initializing magnetic field as an external magnetic field, when a transition occurs in the third magnetic layer from the in-plane magnetization to the perpendicular magnetization. Therefore, the magnetic field strength required for the initializing magnetic field can be reduced. Thus, the initializing magnetic field can be set smaller than the recording magnetic field.

With the conventional arrangement, it is required to reverse the direction of the magnetization of a magnetic layer having a perpendicular magnetization by means of the initializing magnetic field, so as to direct the magnetization of the magnetic layer in one direction. Therefore, the initializing magnetic field is necessarily set greater than the recording magnetic field, thereby causing a recording unit to be bulky. In contrast, the present invention is able to solve such a problem that a recording unit tends to be bulky, because it ensures that the initializing magnetic field can be smaller than the recording magnetic field.

As a method of recording information on the above-mentioned magneto-optical recording medium, employed in the present invention is a method of overwriting by the light intensity modulation. The method is comprised of a step of selectively projecting either a high power laser beam or a low power laser beam on the first magnetic layer in accordance with information to be recorded, so as to carry out overwriting by light intensity modulation with respect to the first magnetic layer. The high power laser beam is set so as to heat the first, second, and third magnetic layers to or above the compensation temperatures of the second and third magnetic layers. The low power laser beam is set to heat the first, second and third magnetic layers to a temperature in a range between the temperature at which the second magnetic layer has a perpendicular magnetization and the lower compensation temperature of the second and third magnetic layers. Thus, information is recorded on the first magnetic layer in accordance with the laser beam selectively having two power levels.

With such a method, when the low power laser beam is projected on the third magnetic layer which has a perpendicular magnetization due to a rise in temperature, the magnetization of the third magnetic layer is directed in one direction in accordance with the external magnetic field serving as the initializing magnetic field. The magnetization of the third magnetic layer thus directed in one direction is copied to the first magnetic layer through the second magnetic layer which now has a perpendicular magnetization.

On the other hand, when the high power laser beam is projected on the third magnetic layer thus initialized, the third magnetic layer is heated to or above its compensation temperature. Since the coercive force of the third magnetic layer decreases as temperature rises to the vicinity of its Curie temperature, the magnetization of the third magnetic layer is directed in one direction, for example, in accordance with the external magnetic field. In the process of cooling off, the direction of the magnetization of the third magnetic layer is reversed, since the temperature falls to or below the compensation temperature of the third magnetic layer. The reversed direction of the magnetization is copied onto the first magnetic layer through the second magnetic layer by the exchange-coupling force.

Thus, by modulating the light intensity of the laser beam to high power and low power, information can be recorded to the first magnetic layer in accordance with directions of the magnetization. Further, since the initializing magnetic field can be set smaller than the recording magnetic field, the size of a unit for generating the respective external magnetic fields can be reduced. Therefore, the size of a recording device can be reduced as well.

For a fuller understanding of the nature and advantages of the invention, reference should be made to the ensuing detailed description taken in conjunction with the accompanying drawings.

DESCRIPTION OF THE PREFERRED EMBODIMENTS

First Embodiment

The following description will discuss the first embodiment of the present invention, referring to FIGS. 1 through 5.

Figure 1:
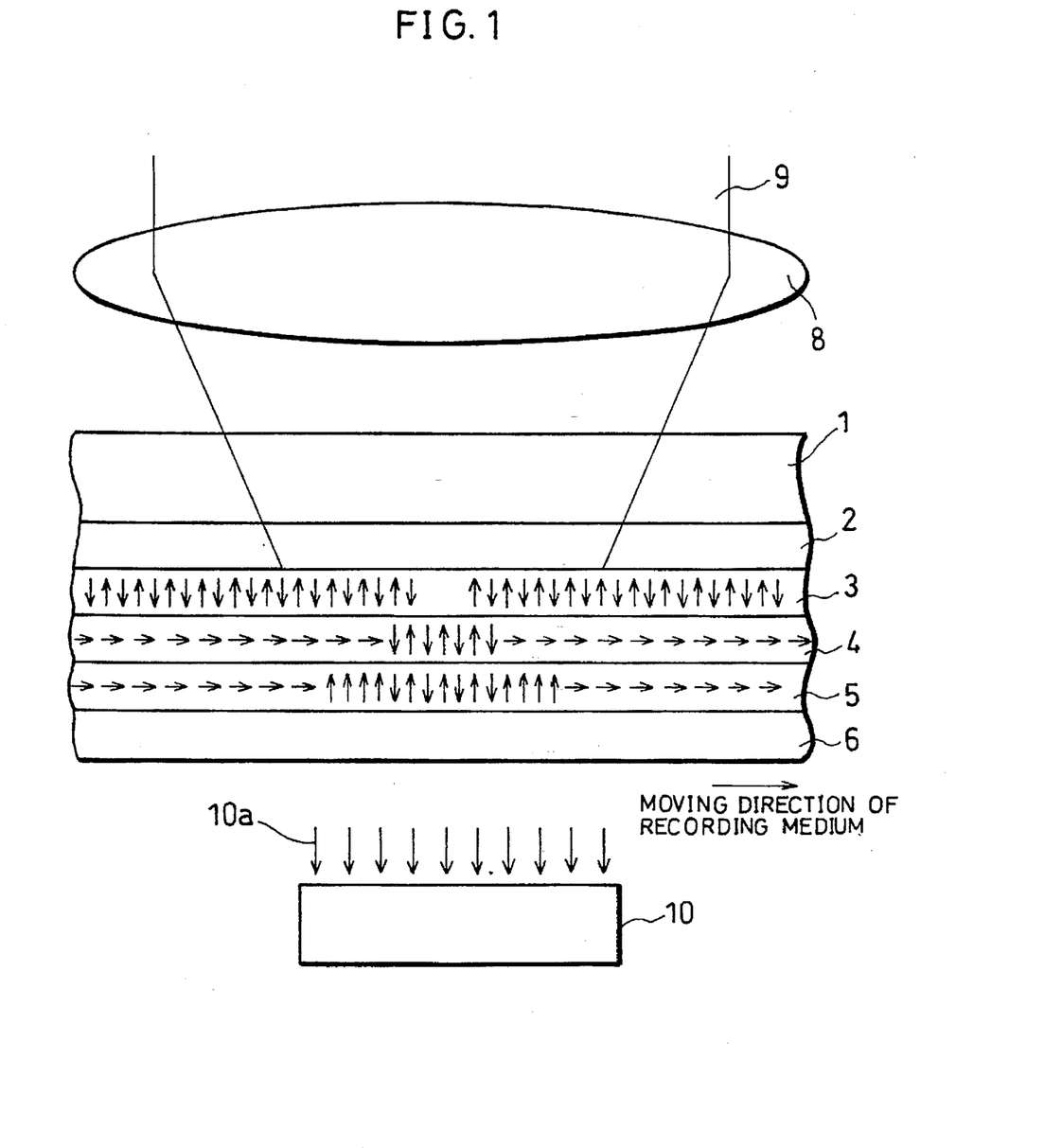
FIG. 1 is an explanatory view showing an arrangement of a magneto-optical recording medium and showing how recording information is carried out thereto in accordance with the first embodiment of the present invention.

A magneto-optical recording medium in accordance with the present embodiment is composed of a transparent substrate 1, as well as a transparent dielectric layer 2, a first magnetic layer 3, a second magnetic layer 4, a third magnetic layer 5, a protective layer 6, and an overcoat layer (not shown), which are laminated on the transparent substrate 1 in this order (see FIG. 1). The first through third magnetic layers 3 through 5 are magnetic substance made of rare earth-transition metal alloys.

The first magnetic layer 3 has a perpendicular magnetization, that is, a perpendicular magnetic anisotropy, in a temperature range between room temperature and the Curie temperature $T_{c1}$ of the first magnetic layer 3. The second magnetic layer 4 has an in-plane magnetization at room temperature while has a perpendicular magnetization at or above a temperature which falls within a range between room temperature and the Curie temperature $T_{c2}$ of the second magnetic layer 4, for example, at or above a temperature $T_1$ which falls within a range between room temperature and the Curie temperature $T_{c1}$ of the first magnetic layer 3 (see FIG. 2). Note that the arrows in FIG. 1 respectively indicate the directions of the sub-lattice magnetization of transition metals in the first through third magnetic layers 3 through 5.

The third magnetic layer 5 has an in-plane magnetization at room temperature while has a perpendicular magnetization at or above a temperature which falls within a range between room temperature and a temperature at which a transition occurs in the second magnetic layer 4 from the in-plane magnetization to the perpendicular magnetization, for example, at or above a temperature falling within a range between the foregoing temperature $T_1$ and the Curie temperature $T_{c1}$ of the first magnetic layer 3.

Figure 2:
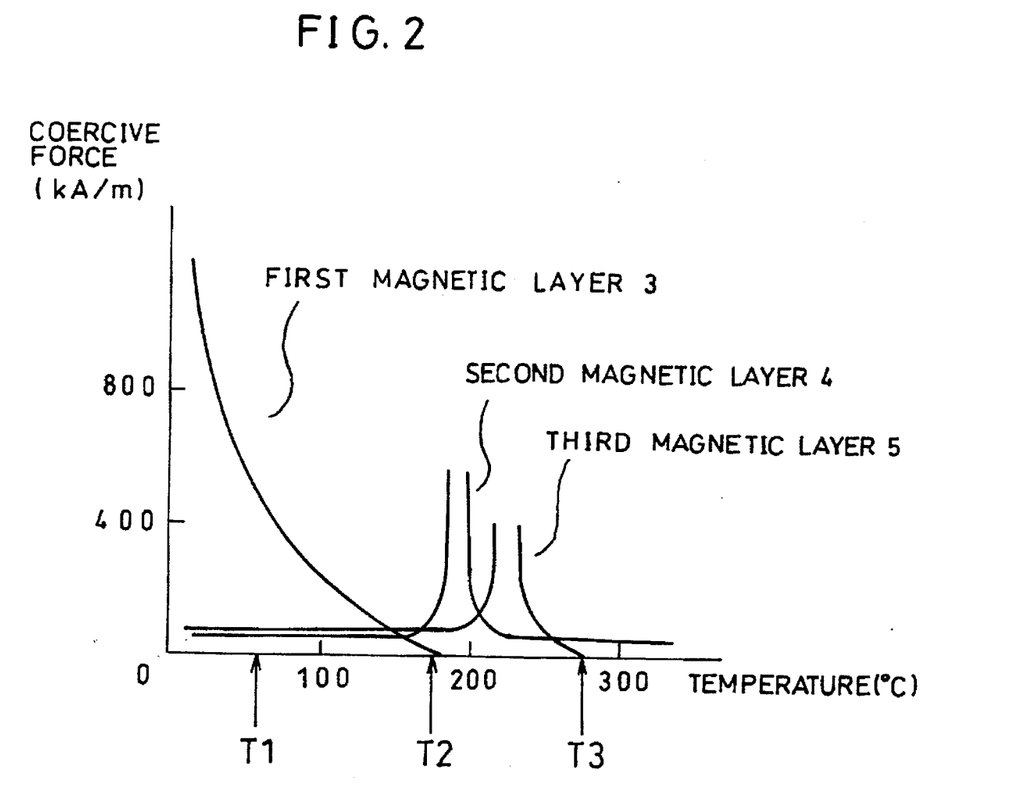
FIG. 2 is a graph showing magnetic properties of respective magnetic layers of the magneto-optical recording medium.

As shown in FIG. 2, in comparison with the second and third magnetic layers 4 and 5, the first magnetic layer 3 has a lower Curie temperature $T_{c1}$ and a greater coercive force $H_{c1}$ at room temperature. The composition of the first magnetic layer 3 is determined so as to be transition metal-rich at room temperature. Therefore, the compensation temperature $T_{comp1}$ of the first magnetic layer 3 is lower than room temperature.

The second magnetic layer 4 has a Curie temperature $T_{c2}$ higher than the Curie temperatures $T_{c1}$ and $T_{c3}$ of the respective first and third magnetic layers 3 and 5. The second magnetic layer 4 has a compensation temperature $T_{comp2}$ falling within a range between the Curie temperature $T_{c1}$ of the first magnetic layer 3 and a compensation temperature $T_{comp3}$ of the third magnetic layer 5.

The third magnetic layer 5 has a Curie temperature $T_{c3}$ higher than the Curie temperature $T_{c1}$ of the first magnetic layer 3. The composition of the third magnetic layer 5 is determined so as to be rare-earth metal rich at room temperature and has the compensation temperature $T_{comp3}$ falling within a range between the compensation temperature $T_{comp2}$ of the second magnetic layer 4 and the Curie temperature $T_{c3}$ of the third magnetic layer 5.

Figure 3:
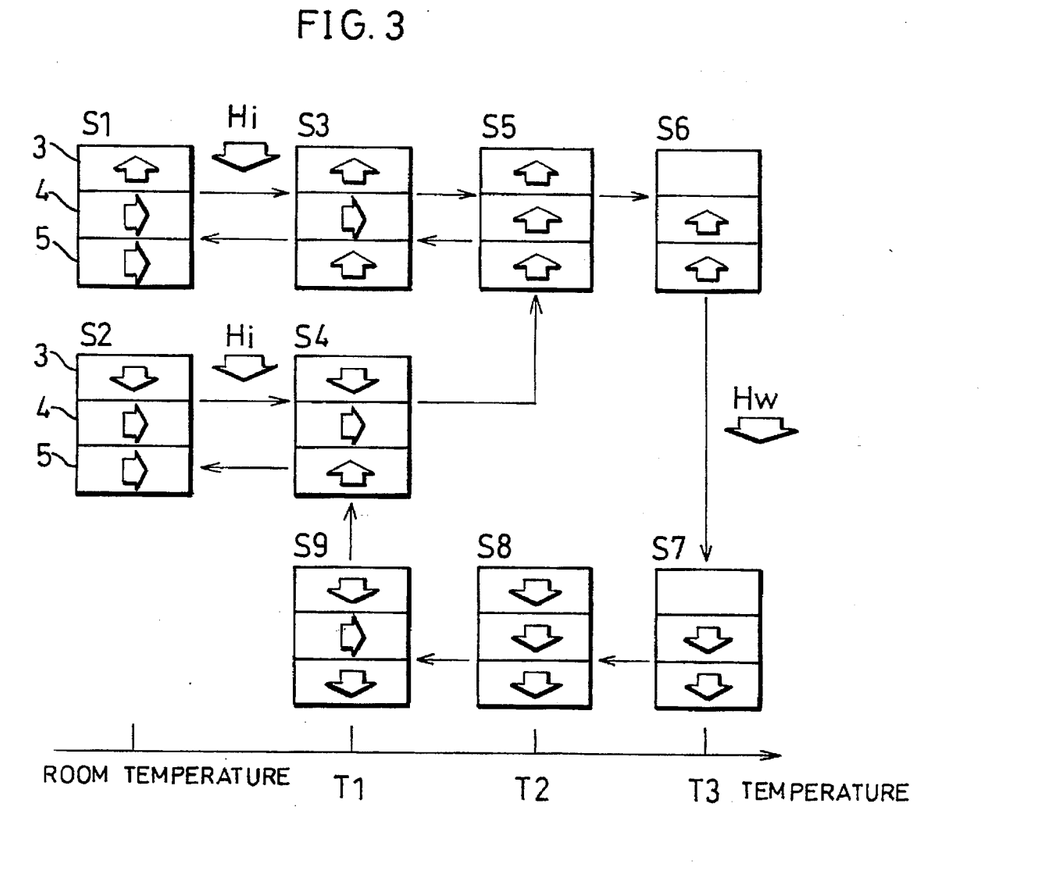
FIG. 3 is an explanatory view showing how the magnetization directions of the respective magnetic layers change in response to changes in temperature.
Figure 4:
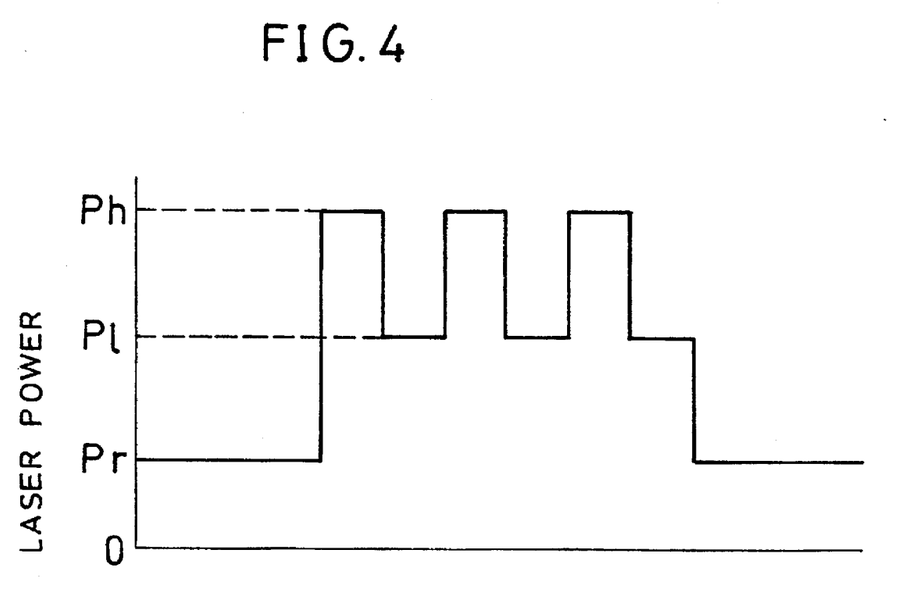
FIG. 4 is a graph showing the intensity of a laser beam which is projected with respect to the magneto-optical recording medium.

Next, the following description will depict a recording method by carrying out a light intensity modulation overwriting method with respect to the first magnetic layer 3, referring FIGS. 1 and 3. FIG. 3 shows states of respective magnetizations of the first magnetic layer 3, the second magnetic layer 4, and the third magnetic layer 5. The abscissa axis indicates temperature. Since the first through third magnetic layers 3 through 5 are rare earth-transition metal alloys, each of them has (1) both the sub-lattice magnetizations of rare-earth metals and transition metals which are antiparallel each other, and (2) a total magnetization as a sum of the sub-lattice magnetizations. Note that voided arrows in the figure represent the directions of the sub-lattice magnetizations of the transition metals in the respective first through third magnetic layers 3 through 5.

The light intensity modulation overwriting is carried out with respect to such a magneto-optical recording medium as follows. First, the magnetization of the third magnetic layer 5 is previously directed in one direction by applying an external magnetic field 10a serving as an initializing magnetic field. Then, while the external magnetic field 10a, serving as a recording magnetic field, is applied to a spot irradiated by a laser beam 9, the intensity of the laser beam 9 is modulated in accordance with digital information, i.e., binary information of "0" and "1". Thus, information is rewritten by such an overwriting operation.

During the overwriting operation, the intensity of the laser beam 9 is controlled so that the following two processes are repeatedly carried out: (1) a process where the laser beam 9 heats a spot to a temperature $T_3$ in the vicinity of the Curie temperature $T_{c3}$ of the third magnetic layer 5 (this process is hereinafter referred to as high power process) and (2) a process where the laser beam 9 heats a spot to a temperature $T_2$ in the vicinity of the Curie temperature $T_{c1}$ of the first magnetic layer 3 (this process is hereinafter referred to as low power process).

An external magnetic field generating unit 10 for generating the external magnetic field 10a is provided in the vicinity of the magneto-optical recording medium, on one surface side of the magneto-optical recording medium, onto the surface laser beam 9 being not projected. The external magnetic field 10a generated by the external magnetic field generating unit 10 is substantially vertical to the surface on the side facing the external magnetic field generating unit 10.

During such an overwriting operation, at first, at room temperature, the second and third magnetic layers 4 and 5 have the in-plane magnetization. Also at room temperature, two stable states S1 and S2 exist depending on the sub-lattice magnetization in the first magnetic layer 3.

Then, the laser beam 9 is projected on the first magnetic layer 3. When the temperature of the portion irradiated by the laser beam 9 is raised to the temperature $T_1$, at which the third magnetic layer 5 has a perpendicular magnetization, the magnetization of the third magnetic layer 5 is directed in a single specific direction, induced by the external magnetic field 10a shown in FIG. 1. Thus, an initialization is conducted. Here, since the third magnetic layer 5 is rare-earth metal rich at the temperature $T_1$, the direction of the sub-lattice magnetization of the transition metal is reverse to that of the external magnetic field 10a, that is, upward in FIG. 3. Namely, the above states S1 and S2 change to the states S3 and S4, respectively.

Figure 5:
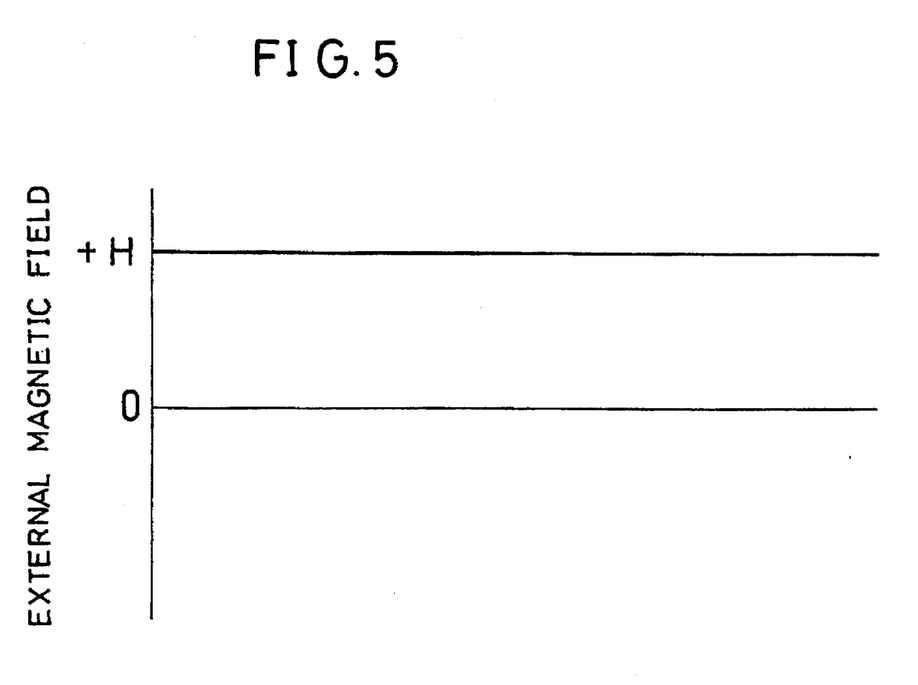
FIG. 5 is a graph showing the strength of a magnetic field which is externally applied to the magneto-optical recording medium.

In the high power process, when the laser beam 9, which has a high power $P_h$ (see FIG. 4) in this process, is projected, the first through third magnetic layers 3 through 5 are heated to the temperature $T_3$ in the vicinity of the Curie temperature $T_{c3}$ of the third magnetic layer 5, which is above the Curie temperature $T_{c1}$ of the first magnetic layer 3. Thus, the first magnetic layer 3 has no longer a magnetization, and the magnetization of the second and third magnetic layers 4 and 5 are directed in a single specific direction in accordance with the external magnetic field 10a due to the magnetic field strength thereof as shown in FIG. 5.

Since the third magnetic layer 5 is transition metal rich at the temperature $T_3$, the sub-lattice magnetization of the transition metal direct in the same direction as that of the external magnetic field 10a, that is, downward in FIG. 3. Namely, each of the states S3 and S4 changes to S5, then to S6, and finally to S7.

Due to the rotation of the magneto-optical recording medium, the portion which has been irradiated by the laser beam 9 becomes out of the scope of the laser beam 9 and is cooled down. When the temperature of the portion falls below the Curie temperature $T_{c1}$ of the first magnetic layer 3, the first magnetic layer 3 regains a magnetization, and the sub-lattice magnetization of the first magnetic layer 3 is directed, by the exchange-coupling force exerted on the interface, in the same direction as that of the sub-lattice magnetizations of the respective second and third magnetic layers 4 and 5. Namely, the state S7 changes to the state S8.

When the temperature further falls down to the temperature $T_1$, the second magnetic layer 4 comes to have an in-plane magnetization. Therefore the exchange-coupling force is no longer exerted between the first and third magnetic layers 3 and 5. When the temperature falls down to room temperature, the third magnetic layer 5 also comes to have an in-plane magnetization. Namely, the state S8 changes to the state S9, then to S4, and finally S2.

In the low power process, when the laser beam 9, which has a low power $P_1$ (see FIG. 4) in this process, is projected, the first through third magnetic layers 3 through 5 are heated to the temperature $T_2$. Here, the magnetization of the third magnetic layer 5 remains unchanged, since the coercive force of the third magnetic layer 5 is greater than the strength of the external magnetic field 10a. Then, like the foregoing case, the sub-lattice magnetization of the first magnetic layer 3 is directed in the same direction as that of the sub-lattice magnetizations of the second and third magnetic layers 4 and 5, by the exchange-coupling force exerted on their interface. Namely, the states S3 and S4 respectively change to the state S5.

Then, due to the rotation of the magneto-optical recording medium, a portion which has been heated by the laser beam 9 becomes out of the scope of the laser beam 9 and is cooled down. When the temperature of the portion falls down to the temperature $T_1$, the second magnetic layer 4 comes to have an in-plane magnetization, and the exchange-coupling force is no longer exerted between the first and third magnetic layers 3 and 5. When the temperature falls down to room temperature, the third magnetic layer 5 also becomes to have an in-plane magnetization. Namely, the state S5 changes to the state S3, and then to the state S1.

Thus, the sub-lattice magnetization of the transition metal of the first magnetic layer 3 is finally directed downward in S2 in the high power process, while upward in S1 in the low power process.

As has been described so far, by using the magneto-optical recording medium of the first embodiment, even when (1) the external magnetic field 10a is set so that its magnetic field strength H and its magnetic field direction are fixed and (2) the external magnetic field 10a is applied to the first through third magnetic layers 3 through 5, the single external magnetic field 10a functions differently depending on temperature. More specifically, the external magnetic field 10a functions as the initializing magnetic field Hi at or below the Curie temperature $T_{c1}$ of the first magnetic layer 3 while as the recording magnetic field Hw when temperature is in the vicinity of the Curie temperature $T_{c3}$ of the third magnetic layer 5. Thus, the light intensity modulation overwriting is carried out with respect to the first magnetic layer 3.

Note that a reproducing operation is carried out by projecting the laser beam 9 which has a reproduction power $P_r$ (see FIG. 4) and detecting the rotation of the polarization plane of the reflected light of the laser beam 9. Since the temperature of the portion irradiated by the laser beam 9 with the reproduction power $P_r$ is significantly lower than the temperature $T_2$, the information recorded with respect to the first magnetic layer 3 is by no means erased by such laser beam 9 in this case.

According to the arrangement of the first embodiment, when the light intensity modulation overwriting is not conducted, it is also possible to record new information with respect to the first magnetic layer 3 after erasing all recorded information, as is the case with the conventional arrangement. Accordingly, the foregoing arrangement the first embodiment can be adopted to the recording devices for the conventional magneto-optical recording media including a magneto-optical disk. In other words, the present arrangement in accordance with the first embodiment has compatibility with the conventional recording devices.

A sample of magneto-optical disks as an example of the foregoing magneto-optical recording medium is shown below.

Sample #1 has a transparent substrate 1, which is a disk-shaped glass with an outer diameter of 86 mm, an inner diameter of 15 mm, and a thickness of 1.2 mm. There is provided, on one surface of the transparent substrate 1, a guide track for guiding a laser beam in a concavo-convex shape with a track pitch of 1.6 µm and a groove width of 0.8 µm. The guide track is formed directly on the surface of the glass of the substrate 1, by the reactive ion etching method.

On the surface of the substrate 1 whereupon the guide tracks are formed, a dielectric layer 2 made of AlN with a thickness of 80 nm is formed by the reactive sputtering method. On the dielectric layer 2 laminated are a first magnetic layer 3 made of DyFeCo with a thickness of 50 nm, a second magnetic layer 4 made of GdFeCo with a thickness of 50 nm, a third magnetic layer 5 made of GdDyFeCo with a thickness 50 nm, and a protective layer 6 made of AlN with a thickness of 20 nm. Here, the first magnetic layer 3 is formed by a simultaneous sputtering method using Dy, Fe, and Co targets. The second magnetic layer 4 is formed by a simultaneous sputtering method using Gd, Fe, and Co targets. The third magnetic layer 5 is formed by a simultaneous sputtering method using Gd, Dy, Fe, and Co targets.

The sputtering conditions in forming the first through third magnetic layers 3 through 5 are as follows:

ultimate vacuum: $2.0 \times 10^{-4}$ Pa or below;

Ar gas pressure: $6.5 \times 10^{-1}$ Pa; and discharge power: 300 W.

The sputtering conditions in forming the dielectric layer 2 and the protective layer 6 are as follows:

ultimate vacuum: $2.0 \times 10^{-4}$ Pa or below;

$N_2$ gas pressure: $3.0 \times 10^{-1}$ Pa; and discharge power: 800 W.

The protective layer 6 is coated with an acrylate ultraviolet hardening resin, and an ultraviolet ray is projected on the acrylate ultraviolet hardening resin so as to harden it, thereby forming an overcoat layer 7.

The first magnetic layer 3 which is made of $Dy_{0.21}(Fe_{0.81}Co_{0.19})_{0.79}$ is transition metal rich and has the following properties:

Curie temperature $T_{c1}=180°$ C.; and coercive force $H_{c1}$ at room temperature=15k Oe.

The second magnetic layer 4 which is made of $Gd_{0.29}(Fe_{0.70}Co_{0.30})_{0.71}$ is rare-earth metal rich at room temperature and has the following properties:

Curie temperature $T_{c2} \geq 300°$ C.;

compensation temperature $T_{comp2}=170°$ C.; and a transition occurs from the in-plane magnetization to the perpendicular magnetization at or above around 120° C.

The third magnetic layer 5 which is made of $(Gd_{0.60}Dy_{0.40})_{0.31}(Fe_{0.70}Co_{0.30})_{0.69}$ is rare-earth metal rich at room temperature and has the following properties:

Curie temperature $T_{c3}=250°$ C.;

compensation temperature $T_{comp3}=200°$ C.; and a transition occurs from the in-plane magnetization to the perpendicular magnetization at or above around 60° C.

Using the magneto-optical disk of sample #1, a recording operation was carried out under the following conditions regarding magnetic field strength H of the external magnetic field 10a, laser powers $P_h$, $P_l$, and $P_r$ of the laser beam 9, and recording bit length:

H=40k A/m;

high power Ph=10 mW;

low power $P_l$=4 mW;

reproduction power $P_r$=1 mW; and recording bit length=0.64 μm.

As a result, the light intensity modulation overwriting could be carried out without inadequate erasing of pre-recorded information. Carrier-to-noise ratio (C/N) was 46 dB.

For comparison, when the conventional magneto-optical recording medium having magnetic layers of a triple-layer structure was used, the required initializing magnetic field as an external magnetic field was 200k A/m. This obviously reveals that the conventional magneto-optical recording medium requires an extremely great initializing magnetic field as an external magnetic field, in comparison with the magneto-optical recording medium in accordance with the present invention.

The following samples #2–#8 of the magneto-optical disk (modified examples of the first embodiment) have the same configurations as those of sample #1 except the second magnetic layer 4.

The second magnetic layer 4 of sample #2 which is made of $Gd_{0.26}(Fe_{0.70}Co_{0.30})_{0.74}$ is rare-earth metal rich and has the following properties:

Curie temperature $T_{c2} \geq 300°$ C.;

compensation temperature $T_{comp2}$=130° C.; and a transition occurs from the in-plane magnetization to the perpendicular magnetization at or above around 70° C.

The second magnetic layer 4 of sample #3 which is made of $Gd_{0.27}(Fe_{0.70}Co_{0.30})_{0.73}$ is rare-earth metal rich and has the following properties:

Curie temperature $T_{c2} \geq 290°$ C.;

compensation temperature $T_{comp2}$=140° C.; and a transition occurs from the in-plane magnetization to the perpendicular magnetization at or above around 80° C.

The second magnetic layer 4 of sample #4 which is made of $Gd_{0.27}(Fe_{0.60}Co_{0.40})_{0.73}$ is rare-earth metal rich and has the following properties:

Curie temperature $T_{c2} \geq 300°$ C.;

compensation temperature $T_{comp2}$=140° C.; and a transition occurs from the in-plane magnetization to the perpendicular magnetization at or above around 80° C.

The second magnetic layer 4 of sample #5 which is made of $Gd_{0.28}(Fe_{0.80}Co_{0.20})_{0.72}$ is rare-earth metal rich and has the following properties:

Curie temperature $T_{c2}$=280° C.;

compensation temperature $T_{comp2}$=150° C.; and a transition occurs from the in-plane magnetization to the perpendicular magnetization at or above around 80° C.

The second magnetic layer 4 of sample #6 which is made of $Gd_{0.28}(Fe_{0.90}Co_{0.10})_{0.72}$ is rare-earth metal rich and has the following properties:

Curie temperature $T_{c2}$=260° C.;

compensation temperature $T_{comp2}$=150° C.; and a transition occurs from the in-plane magnetization to the perpendicular magnetization at or above around 80° C.

The second magnetic layer 4 of sample #7 which is made of $Gd_{0.28}(Fe_{0.65}Co_{0.35})_{0.72}$ is rare-earth metal rich and has the following properties:

Curie temperature $T_{c2} \geq 300°$ C.;

compensation temperature $T_{comp2}$=150° C.; and a transition occurs from the in-plane magnetization to the perpendicular magnetization at or above around 80° C.

The second magnetic layer 4 of sample #8 which is made of $Gd_{0.29}(Fe_{0.80}Co_{0.20})_{0.71}$ is rare-earth metal rich and has the following properties:

Curie temperature $T_{c2}$=280° C.;

compensation temperature $T_{comp2}$=170° C.; and a transition occurs from the in-plane magnetization to the perpendicular magnetization at around 120° C.

As a result, an overwriting operation by the light intensity modulation could be carried out on all of the above samples #2–#8 without inadequate erasing of pre-recorded information. Carrier-to-noise ratio (C/N) was 46 dB.

The following samples #9–#12 of the magneto-optical disk (other modified examples of the first embodiment) have the same configurations as those of sample #1 except the first magnetic layer 3.

The first magnetic layer 3 of sample #9 which is made of $Dy_{0.21}(Fe_{0.84}Co_{0.16})_{0.79}$ is transition metal rich and has the following properties:

Curie temperature $T_{c1}$=170° C.; and coercive force at room temperature $H_{c1}$=15k Oe.

The first magnetic layer 3 of sample #10 which is made of $Dy_{0.23}(Fe_{0.84}Co_{0.16})_{0.77}$ has a compensation composition and has the following properties:

Curie temperature $T_{c1}$=150° C.; and coercive force at room temperature $H_{c1} \geq 20k$ Oe.

The first magnetic layer 3 of sample #11 which is made of $Dy_{0.23}(Fe_{0.80}Co_{0.20})_{0.77}$ has a compensation composition and has the following properties:

Curie temperature $T_{c1}$=165° C.; and coercive force at room temperature $H_{c1} \geq 20k$ Oe.

The first magnetic layer 3 of sample #12 which is made of $Dy_{0.19}(Fe_{0.84}Co_{0.16})_{0.81}$ is transitional metal rich and has the following properties:

Curie temperature $T_{c1}$=200° C.; and coercive force at room temperature $H_{c1}$=8k Oe.

As a result, the light intensity modulation overwriting could be carried out on all of the above samples #9–#12 without inadequate erasing of pre-recording information. Carrier-to-noise ratio (C/N) was 46 dB.

The following samples #13–#15 of the magneto-optical disk (still other modified examples of the first embodiment) have the same configurations as those of sample #1 except the third magnetic layer 5.

The third magnetic layer 5 of sample #13 which is made of $(Gd_{0.60}Dy_{0.40})_{0.32}(Fe_{0.70}Co_{0.30})_{0.68}$ is rare-earth metal rich and has the following properties:

Curie temperature $T_{c3}$=250° C.;

compensation temperature $T_{comp3}$=220° C.; and a transition occurs from the in-plane magnetization to the perpendicular magnetization at or above around 60° C.

The third magnetic layer 5 of sample #14 which is made of $(Gd_{0.70}Dy_{0.30})_{0.30}(Fe_{0.70}Co_{0.30})_{0.70}$ is rare-earth metal rich and has the following properties:

Curie temperature $T_{c3}$=300° C.;

compensation temperature $T_{comp3}$=210° C.; and a transition occurs from the in-plane magnetization to the perpendicular magnetization at or above around 60° C.

The third magnetic layer 5 of sample #15 which is made of $(Gd_{0.70}Dy_{0.30})_{0.31}(Fe_{0.80}Co_{0.20})_{0.69}$ is rare-earth metal rich and has the following properties:

Curie temperature $T_{c3}$=290° C.;

compensation temperature $T_{comp3}$=210° C.; and a transition occurs from the in-plane magnetization to the perpendicular magnetization at or above around 60° C.

As a result, an overwriting operation by the light intensity modulation could be carried out on all of the above samples

13–#15 without inadequate erasing of pre-recorded information. Carrier-to-noise ratio (C/N) was 46 dB.

As has been observed so far, with the arrangement in accordance with the first embodiment, when a rise in temperature is caused by the laser beam 9, the respective directions of the magnetization of the third magnetic layer 5 are copied to the first magnetic layer 3 having the perpendicular magnetization, through the intermediary of the second magnetic layer 4 which has already had a perpendicular magnetization. Thus, it is enabled that information is recorded on the first magnetic layer 3 in accordance with the directions of the magnetization, by means of the laser beam 9 and the external magnetic field 10a as a recording magnetic field.

Furthermore, according to the foregoing arrangement, the magnetic field strength required for the initializing magnetic field can be set smaller, since an initialization for directing the magnetization of the third magnetic layer 5 in a single specific direction by the induction of the external magnetic field 10a as the initializing magnetic field is carried out when a transition occurs in the third magnetic layer 5 from the in-plane magnetization to the perpendicular magnetization. Therefore, it is possible that the initializing magnetic field is set smaller than the recording magnetic field.

Additionally, according to the above arrangement, it is possible to direct in the same direction the initializing magnetic field and the recording magnetic field, both of which are the external magnetic field 10a. Therefore, both the initializing magnetic field and the recording magnetic field can be generated by a single unit, namely, the magnetic field generating unit 10 in the present embodiment. Thus, the above arrangement ensures to prevent the bulking up of the recording device for recording information on the above-mentioned medium.

More specifically, the direction of the magnetization of the first magnetic layer 3 is determined by the sum of the respective magnetic moments of the sub-lattice magnetizations of the rare-earth metal and the transition metal, which change depending on temperature. However, since the first magnetic layer 3 is set so as to be transition metal rich in a temperature range between room temperature and its Curie temperature $T_{c1}$, the direction of the magnetization of the first magnetic layer 3 as a sum of the above magnetic moments is not reversed depending on temperature when temperature falls within the above-mentioned temperature range.

The third magnetic layer 5 has properties that its compensation temperature $T_{comp3}$ falls within a temperature range between its Curie temperature $T_{c3}$ and room temperature, and that it is rare-earth metal rich at room temperature. When temperature rises over the compensation temperature $T_{comp3}$ to the vicinity of the Curie temperature $T_{c3}$, the third magnetic layer 5 becomes transition metal rich, while its coercive force becomes zero or in the vicinity of zero. Therefore, even though the external magnetic field 10a is small, it is possible to direct the magnetization of the third magnetic layer 5 in accordance with the external magnetic field 10a.

Then, when the laser beam 9 moves away, the portion which has been irradiated is cooled down. Thus, temperature falls down to or below the compensation temperature $T_{comp3}$, and the third magnetic layer 5 becomes rare-earth metal rich, thereby resulting in that the foregoing direction of the magnetization is reversed.

The second magnetic layer 4 has properties that it is rare-earth metal rich at room temperature, and that its compensation temperature $T_{comp2}$ falls within a temperature range between its Curie temperature $T_{c2}$ and room temperature. Therefore, since the saturation magnetization of the third magnetic layer 5 is nearly zero at a temperature in the vicinity of the compensation temperature $T_{comp3}$ of the third magnetic layer 5, the coercive force of the second magnetic layer 4 is necessarily set greater than the saturation magnetization of the third magnetic layer 5. Accordingly, after temperature falls down to or below the compensation temperature $T_{comp3}$ in the cooling down process, the direction of the third magnetic layer 5, which has already been reversed, is copied onto the second magnetic layer 4.

Thus, according to the foregoing arrangement, the magnetization of the third magnetic layer 5 is directed in accordance with the external magnetic field 10a serving in this case as the recording magnetic field, and then it is reversed in the cooling down process. Therefore, it is possible to direct in the same direction the initializing magnetic field and the recording magnetic field, respectively for previously initializing the third magnetic layer 5 and for in the heating process directing the magnetization of the third magnetic layer 5, which is later reversed in the cooling down process.

Therefore, with the above-mentioned arrangement, the initializing magnetic field and the recording magnetic field, which are generated respectively by separate units in accordance with the conventional arrangement, can be generated by the integrally provided single magnetic field generating unit 10, such as an electromagnet. Therefore, in comparison with the conventional arrangement, the above arrangement enables to avoid the bulking up of a recording device for recording information to a medium. In addition, with the above arrangement, it is possible to omit the controlling of reversing the direction of the recording magnetic field with respect to the initializing magnetic field, which is inevitable for the conventional arrangement.

Furthermore, when the conventional magneto-optical recording medium is employed for recording information thereto while a single magnetic field generating unit is employed for generating both the initializing and recording magnetic fields, the following procedure is required. First, since the third magnetic layer needs to be previously initialized, the initializing magnetic field (Hi) is applied to the third magnetic layer for the initialization. Then the recording medium should be rotated so that the original position is accessed again, thereby causing the total time for recording to prolong because it is required to record information to the first magnetic layer through the intermediary of the third magnetic layer in accordance with the laser beam and the recording magnetic field (Hw).

In contrast, the arrangement of the single external magnetic field 10a in accordance with the first embodiment can shorten the time for recording, compared with the conventional arrangement. As can be seen above, it is possible to check whether the magnetization of the third magnetic layer 5 has been reversed in accordance with the light intensity modulation of the laser beam 9, while carrying out the initialization on the third magnetic layer 5 of the magneto-optical recording medium which is rotating. Thus, such an arrangement can omit the step of rotating the magneto-optical recording medium so as to access the original position again, thereby cutting down the time required for recording, in comparison with the conventional arrangement.

Second Embodiment

Figure 6:
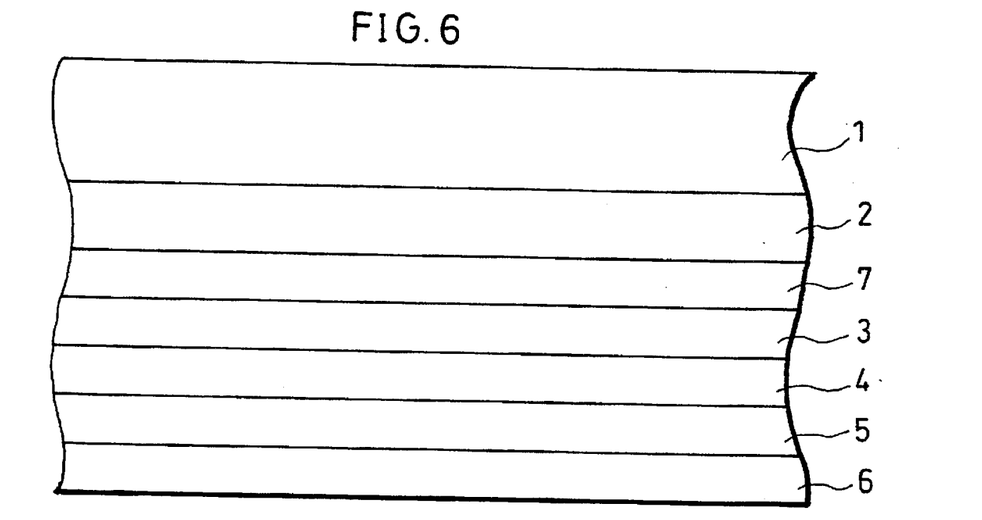
FIG. 6 is an explanatory view showing an arrangement of a magneto-optical recording medium in accordance with the second embodiment of the present invention.

The following description will discuss another embodiment of the present invention (the second embodiment), referring to FIG. 6. The members having the same structure (function) as in the first embodiment will be designated by the same reference numerals and their description will be omitted.

A magneto-optical recording medium in accordance with the second embodiment, as shown in FIG. 6, is the same configurations as those of the magneto-optical recording medium in accordance with the first embodiment except an additional fourth magnetic layer 7, which is provided between the dielectric layer 2 and the first magnetic layer 3.

The fourth magnetic layer 7 is arranged so as to have a Curie temperature ($T_{c4}$) above that of the first magnetic layer 3, coercive force ($H_{c4}$) of nearly zero at room temperature, and an in-plane magnetization at room temperature. A transition occurs in the fourth magnetic layer 7 from the in-plane magnetization to the perpendicular magnetization at a certain temperature falling within a range between room temperature and the Curie temperature $T_{c1}$ of the first magnetic layer 3.

A magneto-optical disk is shown below as an example of the magneto-optical recording medium in accordance with the above arrangement.

A magneto-optical disk of sample #16 has the same configurations as those of the described sample #1 except an additional fourth magnetic layer 7, which is 30 nm in thickness and is provided between the dielectric layer 2 and the first magnetic layer 3. It is produced in the same manner as that for the sample #1 in the first embodiment.

The fourth magnetic layer 7 of sample #16 made of $Gd_{0.29}(Fe_{0.80}Co_{0.20})_{0.71}$ is rare-earth metal rich and has the following properties:

Curie temperature $T_{c4}=300°$ C.;

no compensation temperature; and a transition occurs from the in-plane magnetization to the perpendicular magnetization at or above around 120° C.

As a result, an overwriting operation by the light intensity modulation could be carried out on the above magneto-optical disk of sample #16 without inadequate erasing of pre-recorded information. Carrier-to-noise ratio (C/N) was 47 dB. Compared with the case of sample #1 in which the C/N was 46 dB, the signal quality is improved. It can be considered that because by setting $T_{c4}$ higher than $T_{c1}$, a Kerr rotation angle in accordance with the direction of each perpendicular magnetization which was copied to the fourth magnetic layer 7 became greater, thereby causing the improvement of the signal quality.

In addition, when the recording bit length became shorter, C/N of the sample #1 drastically fell down, whereas a decrease in C/N of the sample #16 was slight in such a condition. It is considered that this improvement was achieved from the following reason. The fourth magnetic layer 7 has an in-plane magnetization as an in-plane magnetic anisotropy at room temperature, whereas it has a perpendicular magnetization when it is irradiated by the laser beam 9 having the reproduction laser power. Therefore, even in the case where a recording bit forming a magnetic domain determining a magnetization having one direction is small, a reproducing operation can be carried out without being affected by adjacent recording bits.

To be more specific, with the arrangement in accordance with the second embodiment, when information in accordance with each magnetization direction of the first magnetic layer 3 is reproduced by projecting the laser beam 9 thereto, temperature of a spot of the laser beam 9 on the fourth magnetic layer 7 is raised unevenly, specifically high in the center while low in the periphery. Therefore, it is possible to control the laser beam 9 so that temperature of the spot is partially raised to above a temperature at which a transition in the fourth magnetic layer 7 occurs from the in-plane magnetization to the perpendicular magnetization.

Accordingly, only the magnetization recorded in the first magnetic layer 3 corresponding to the limited portion of the irradiated spot on the fourth magnetic layer 7 having a perpendicular magnetization is copied to the fourth magnetic layer 7. Thus, information recorded in accordance with the directions of the magnetization of the first magnetic layer 3 can be reproduced through the intermediary of the fourth magnetic layer 7 by using the laser beam 9.

Moreover, according to the foregoing arrangement, the magnetization direction recorded on the first magnetic layer 3 33 corresponding to the peripheral portion on the fourth magnetic layer 7, which has an in-plane magnetization because of low temperature, is not copied onto the fourth magnetic layer 7, namely, it is masked from copying. Thus, such a masking ensures to prevent the magnetization direction of the first magnetic layer 3, which corresponds to the low-temperature portion, from affecting the signals reproduced, due to the projection of the laser beam 9, in accordance with the magnetization direction of the first magnetic layer 3 which correspond to the high-temperature portion.

Therefore, the foregoing arrangement enables to more precisely reproduce the magnetization direction of the first magnetic layer 3 which was recorded on a portion smaller than the spot of the laser beam 9, through the intermediary of the fourth magnetic layer 7. Accordingly, it is possible to enhance the density of the recording bits which is recorded in accordance with the magnetization directions of the first magnetic layer 3.

In the first and second embodiments, glass was used as a substrate 1 in samples #1–#16. However, other than the glass, a 2P layered glass substrate composed of (1) a chemically tempered glass substrate and (2) an ultraviolet ray hardening resin film formed on the glass substrate, polycarbonate (PC), polymethyl methacrylate (PMMA), amorphous polyolefin (APO), polystyrene (PS), polybiphenyl chloride (PVC) epoxy, etc., may be substituted for the substrate 1.

The thickness of AlN (transparent dielectric layer 2) is not limited to 80 nm. The thickness of the transparent dielectric film 2 is determined in considering a so-called Kerr effect enhancement which enhances a polar Kerr rotation angle from the first magnetic layer 3 or the fourth magnetic layer 7 utilizing the interference effect of light in reproducing from the magneto-optical disk. In order to make the signal quality (C/N) in reproducing as high as possible, the Kerr rotation angle should be as large as possible. Accordingly, the film thickness of the dielectric layer 2 is set to such that the Kerr rotation angle becomes greater.

The transparent dielectric layer 2 also prevents the oxidization of the first through third magnetic layers 3 through 5 or the first through fourth magnetic layers 3 through 5 and 7 which are respectively made of rare earth-transition metal alloys, in combination of the protective layer 6.

Additionally, using Al target, AlN may be obtained by a reactive DC (direct current) sputtering which is carried out by introducing $N_2$ gas or mixed gas of Ar and $N_2$. This sputtering method has an advantage that a faster film forming speed can be achieved compared with the RF (radio frequency) sputtering method.

Other than AlN, the following materials are suitable for the transparent dielectric layer 2: SiN, AlSiN, AlTaN, SiAlON, TiN, TiON, BN, ZnS, TiO$_2$, BaTiO$_3$, and SrTiO$_3$. Among others, since SiN, AlSiN, AlTaN, TiN, BN, and ZnS do not include oxygen in their respective compositions, the magneto-optical disk which has an excellent moisture resistance can be achieved.

The respective compositions of DyFeCo used in the first magnetic layer 3, GdFeCo used in the second magnetic layer 4, and GdDyFeCo used in the third magnetic layer 5 are not limited to those shown in the above embodiments, provided that the properties of the respective first through third magnetic layers 3 through 5 are met. As materials for the first through third magnetic layers 3 through 5, an alloy may be used in which at least one element selected from the rare-earth metal group consisting of Gd, Tb, Dy, Ho, and Nd and at least one element selected from the transition metal group consisting of Fe and Co are combined.

Furthermore, by adding at least one element selected from the group consisting of Cr, V, Nb, Mn, Be, Ni, Ti, Pt, Rh, and Cu, the respective resistances to environment of the first through third magnetic layers 3 through 5 can be improved. Namely, the deterioration of the properties of the first through third magnetic layers 3 through 5 due to the oxidation of the material by moisture and oxygen being entered can be prevented, thereby ensuring a reliable performance of the magneto-optical disk for a long period of time.

The respective film thickness of the first through third magnetic layers 3 through 5 are determined by considering the correlation among the materials used in the first magnetic layers 3 through 5, the compositions thereof and the thickness of other magnetic layers. Specifically, the film thickness of the first magnetic layer 3 is preferably set to or above 20 nm, more preferably to or above 30 nm. On the other hand, when the first magnetic layer 3 becomes too thick, information recorded on the third magnetic layer 5 may not be copied thereto. Thus, it is preferably set to or below 100 nm. The film thickness of the second magnetic layer 4 is preferably set to or above 5 nm, more preferably set in a range of 10 nm–50 nm. On the other hand, when the second magnetic layer 4 becomes too thick, information recorded on the third magnetic layer 5 may not be copied thereto. Thus, it is preferably set to or below 100 nm.

The film thickness of the third magnetic layer 5 is preferably set to or above 20 nm, more preferably set in a range of 30 nm–100 nm. On the other hand, when the third magnetic layer 5 becomes too thick, information recorded thereon may not be copied to the other magnetic layers. Thus, it is preferably set to or below 200 nm. Whereas in the foregoing embodiments, the film thickness of AlN of the protective layer 6 is set to 80 nm, it is not limited to as such. The film thickness of the protective layer 6 is preferably set in a range of 1 nm–200 nm.

The thermal conductivity of the protective layer 6 as well as the transparent dielectric layer 2 affects the recording sensitivity of the magneto-optical disk. Specifically, the recording sensitivity represents the laser power required for recording or erasing. The light incident on the magneto-optical disk is mainly transmitted through the transparent dielectric layer 2. Then, it is absorbed by the first through third magnetic layers 3 through 5 or the first through fourth magnetic layer 3 through 5 and 7 which are absorbing films. The light thus absorbed is changed into heat there.

Here, heat generated from the first through third magnetic layers 3 through 5 or the first through fourth magnetic layers 3 through 5 and 7 moves through the intermediary of the transparent dielectric layer 2 and the protective layer 6 by the conduction of heat. Therefore, the respective thermal conductivities and the thermal capacities (specific heat) of the transparent dielectric layer 2 and the protective layer 6 affect the recording sensitivity.

This means that the recording sensitivity of the magneto-optical disk can be controlled to some extent by adjusting the film thickness of the protective layer 6. For example, by making the protective layer 6 thinner, the recording sensitivity can be increased (a recording or erasing operation can be carried out with low laser power). Normally, in order to extend the life of the laser, it is preferable to have relatively high recording sensitivity, and thus the thinner protective layer 6 is preferable.

In this sense also, AlN is suitable material. Because of its excellent moisture resistance, by adopting it to the protective layer 6, the film thickness can be made thinner and the magneto-optical disk which ensures a high recording sensitivity can be achieved. By making both the protective layer 6 and the transparent dielectric layer 2 of AlN, as the foregoing first and second embodiments did, a magneto-optical recording medium with excellent moisture resistance can be achieved. Furthermore, by making both the protective layer 6 and the transparent dielectric layer 2 of a single material, the productivity is enhanced as well.

In considering the above objective and effect, other than AlN, the following materials which can be used also as materials for the transparent dielectric layer 2 are suitable for the protective layer 6: SiN, AlSiN, AlTaN, SiAlON, TiN, TiON, BN, ZnS, TiO$_2$, BaTiO$_3$, and SrTiO$_3$. Especially, when either SiN, AlSiN, AlTaN, TiN, BN, or ZnS which does not include oxygen in its composition is used, a magneto-optical disk which has an excellent moisture resistance can be achieved.

The magneto-optical disks of samples #1–#16 are so-called single sided type. A thin film composed of the transparent dielectric layer 2, the first through third magnetic layers 3 through 5 (or the first through fourth magnetic layers 3 through 5 and 7), and the protective layer 6 is hereinafter referred to as a recording medium layer. The magneto-optical recording medium such as the magneto-optical disk of the single sided type is composed of the substrate 1, the recording medium layer and the overcoat layer.

On the other hand, the magneto-optical recording medium such as a magneto-optical disk of a both-sided type is arranged such that a pair of the substrates 1 whereupon the recording medium layers are respectively laminated are stuck to one another by an adhesive layer so that respective recording medium layers confront one another.

As to the material for the adhesive layer, especially, polyurethane acrylate adhesive is preferable. The above adhesive layer is provided with a combination of the hardening properties obtained by ultraviolet ray, heat and anaerobic. Therefore, this adhesive layer has an advantage that the shadow portion of the recording medium layer through which the ultraviolet ray is not transmitted can be hardened by heat and anaerobic. Moreover, because of its high moisture resistance, a reliable performance of the magneto-optical disk of double-sided type can be ensured for a long period of time.

On the other hand, the magneto-optical disk of a single-sided type is suitable for a compact magneto-optical recording and reproducing device because the required thickness is as thin as one half of that required for the both-sided magneto-optical disk.

The magneto-optical disk of a double-sided type is suitable for the large capacity magneto-optical recording and reproducing device because both sides can be used for recording and reproducing.

In the above embodiments, explanations have been given through the case of the magneto-optical disk as a magneto-optical recording medium. However, the present invention may be adapted to magneto-optical card, magneto-optical tape.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical recording medium comprising:

a substrate;

a first magnetic layer made of a rare earth-transition metal alloy, said first magnetic layer being provided on said substrate;

a second magnetic layer made of a rare earth-transition metal alloy, said second magnetic layer being provided on said first magnetic layer; and a third magnetic layer made of a rare earth-transition metal alloy, said third magnetic layer being provided on said second magnetic layer, wherein:

said first magnetic layer has a perpendicular magnetization in a temperature range between room temperature and its Curie temperature, and said first magnetic layer is provided so that information is read out in accordance with a direction of the perpendicular magnetization of said first magnetic layer to which a laser beam is projected;

said second magnetic layer has an in-plane magnetization at room temperature, while has a perpendicular magnetization at or above a temperature which falls within a range between room temperature and its Curie temperature, and said second magnetic layer is provided so as to control exchange-coupling force exerted between said third and first magnetic layers in accordance with temperature change due to the projected laser beam; and said third magnetic layer has an in-plane magnetization at room temperature, and has a perpendicular magnetization at or above a temperature which falls within a range between room temperature and the temperature at which a transition occurs in said second magnetic layer from the in-plane magnetization to the perpendicular magnetization, and said third magnetic layer is provided so that the magnetization direction recorded as information is copied to said first magnetic layer through said second magnetic layer, the magnetization direction being recorded in accordance with temperature change due to the projected laser beam as well as in accordance with an external magnetic field.

2. The magneto-optical recording medium as set forth in claim 1, wherein:

said first magnetic layer is transition metal rich in a temperature range between room temperature and its Curie temperature, where magnetic moment of the transition metal is greater than that of the rare-earth metal, said second magnetic layer is rare-earth metal rich at room temperature, where the magnetic moment of rare-earth metal is greater than that of the transition metal, and said second magnetic layer has a compensation temperature falling within a range between room temperature and its Curie temperature, and said third magnetic layer is rare-earth metal rich at room temperature, and has a compensation temperature falling within a range between room temperature and its Curie temperature.

3. The magneto-optical recording medium as set forth in claim 1, wherein a compensation temperature of said second magnetic layer is higher than the Curie temperature of said first magnetic layer and lower than a compensation temperature of said third magnetic layer.

4. A magneto-optical recording medium as set forth in claim 1, further comprising a fourth magnetic layer provided on one surface of said first magnetic layer, said second magnetic layer being provided on the other surface of said first magnetic layer, wherein:

said fourth magnetic layer has a Curie temperature higher than that of said first magnetic layer, has an in-plane magnetization at room temperature, and has a perpendicular magnetization at or above a temperature which falls within a range between room temperature and the temperature at which a transition occurs in said second magnetic layer from the in-plane magnetization to the perpendicular magnetization.

5. The magneto-optical recording medium as set forth in claim 1, wherein:

said first magnetic layer is made of $Dy_a(Fe_bCo_{1-b})_{1-a}$, said second magnetic layer is made of $Gd_c(Fe_dCo_{1-d})_{1-c}$, and, said third magnetic layer is made of $(Gd_eDy_{1-e})_g(Fe_fCo_{1-f})_{1-g}$, said a, b, c, d, e, f, and g respectively satisfying $0.19 \leq a \leq 0.23$, $0.80 \leq b \leq 0.84$, $0.26 \leq c \leq 0.29$, $0.60 \leq d \leq 0.90$, $0.60 \leq e \leq 0.70$, $0.70 \leq f \leq 0.80$, and $0.30 \leq g \leq 0.32$.

6. The magneto-optical recording medium as set forth in claim 1, wherein the Curie temperature of said first magnetic layer falls within a range between 150° C. and 200° C., and coercive force of said first magnetic layer at room temperature is not less than 8k Oe.

7. The magneto-optical recording medium as set forth in claim 1, wherein said second magnetic layer has the perpendicular magnetization at or above 80° C.

8. The magneto-optical recording medium as set forth in claim 1, wherein said third magnetic layer has the perpendicular magnetization at or above 60° C.

9. The magneto-optical recording medium as set forth in claim 2, wherein the compensation temperature of said second magnetic layer falls within a range between 130° C. and 170° C.

10. The magneto-optical recording medium as set forth in claim 2, wherein the compensation temperature of said third magnetic layer falls within a range between 200° C. and 220° C.

11. The magneto-optical recording medium as set forth in claim 1, wherein each of the rare earth-transition metal alloys respectively forming said first, second and third magnetic layers is an alloy composed of at least one rare-earth metal and at least one transition metal, the rare-earth metal being selected from the group consisting of Gd, Tb, Dy, Ho, and Nd, the transition metal being selected from the group consisting of Fe and Co.

12. The magneto-optical recording medium as set forth in claim 11, wherein at least one element selected from the group consisting of Cr, V, Nb, Mn, Be, Ni, Ti, Pt, Rh, and Cu is added to each of said rare earth-transition metal alloys.

13. The magneto-optical recording medium as set forth in claim 1, wherein:

said first magnetic layer has a film thickness in a range between 20 nm and 100 nm, said second magnetic layer has a film thickness in a range between 5 nm and 100 nm, and said third magnetic layer has a film thickness in a range between 20 nm and 200 nm.

14. A magneto-optical recording medium as set forth in claim 1, further comprising a transparent dielectric layer, a protective layer and an overcoat layer, wherein said transparent dielectric layer, said first magnetic layer, said second magnetic layer, said third magnetic layer, said protective layer, and said overcoat layer are laminated on said substrate in this order.

15. A magneto-optical recording medium as set forth in claim 4, further comprising a transparent dielectric layer, a protective layer, and an overcoat layer, wherein said transparent dielectric layer, said fourth magnetic layer, said first magnetic layer, said second magnetic layer, said third magnetic layer, said protective layer, and said overcoat layer are laminated on said substrate in this order.

16. A method for recording a magneto-optical recording medium by use of an external magnetic field, said method comprising the step of:

configuring said magneto-optical recording medium to include a substrate;

a first magnetic layer made of a rare earth-transition metal alloy, said first magnetic layer being provided on said substrate;

a second magnetic layer made of a rare earth-transition metal alloy, said second magnetic layer being provided on said first magnetic layer; and a third magnetic layer made of a rare earth-transition metal alloy, said third magnetic layer being provided on said second magnetic layer, wherein:

said first magnetic layer has a perpendicular magnetization in a temperature range between room temperature and its Curie temperature, and said first magnetic layer is provided so that information is read out in accordance with a direction of the perpendicular magnetization of said first magnetic layer to which a laser beam is projected;

said second magnetic layer has an in-plane magnetization at room temperature, while has a perpendicular magnetization at or above a temperature which falls within a range between room temperature and its Curie temperature, and said second magnetic layer is provided so as to control exchange-coupling force exerted between said third and first magnetic layers in accordance with temperature change due to the projected laser beam; and said third magnetic layer has an in-plane magnetization at room temperature, and has a perpendicular magnetization at or above a temperature which falls within a range between room temperature and the temperature at which a transition occurs in said second magnetic layer from the in-plane magnetization to the perpendicular magnetization, and said third magnetic layer is provided so that the magnetization direction recorded as information is copied to said first magnetic layer through said second magnetic layer, the magnetization direction being recorded in accordance with temperature change due to the projected laser beam as well as in accordance with an external magnetic field projecting either a high power laser beam or a low power laser beam on said first magnetic layer in accordance with information to be recorded, so as to carry out overwriting by light intensity modulation with respect to said first magnetic layer, the high power laser beam heating said first, second, and third magnetic layers to or above the compensation temperatures of said second and third magnetic layers, and the low power laser beam heating said first, second, and third magnetic layers to a temperature in a range between the temperature at which said magnetic layer has the perpendicular magnetization and the lower compensation temperature of said second and third magnetic layers.

17. The recording method as set forth in claim 16, wherein:

the external magnetic field is a substantially perpendicular magnetic field with respect to said third magnetic layer, and the external magnetic field is applied, as a recording magnetic field, to a portion of the magneto-optical recording medium which is heated by the high power laser beam such that the direction of the magnetization of said third magnetic layer directs in accordance with said external magnetic field, the recording magnetic field directing the magnetization of said third magnetic layer in accordance with the external magnetic field.

18. The recording method as set forth in claim 16, wherein when said third magnetic layer is heated by the laser beam such that the transition occurs from the in-plane magnetization to the perpendicular magnetization in said third magnetic layer, the external magnetic field is applied, as the initializing magnetic field, to said third magnetic layer, the initializing magnetic field directing the magnetization of said third magnetic layer in accordance with the external magnetic field.

19. The recording method as set forth in claim 16, wherein the external magnetic field is applied with respect to the magneto-optical recording medium in a manner so that the external magnetic field has a magnetic flux density distribution of high magnetic flux density and low magnetic flux density, the high magnetic flux density being used as a recording magnetic field while the low magnetic flux density as an initializing magnetic field.

* * * * *